Dec. 29, 1925
J. N. ERLANDSEN
BUTT LINE RIGGING PLATE
Filed May 5, 1924
1,567,719
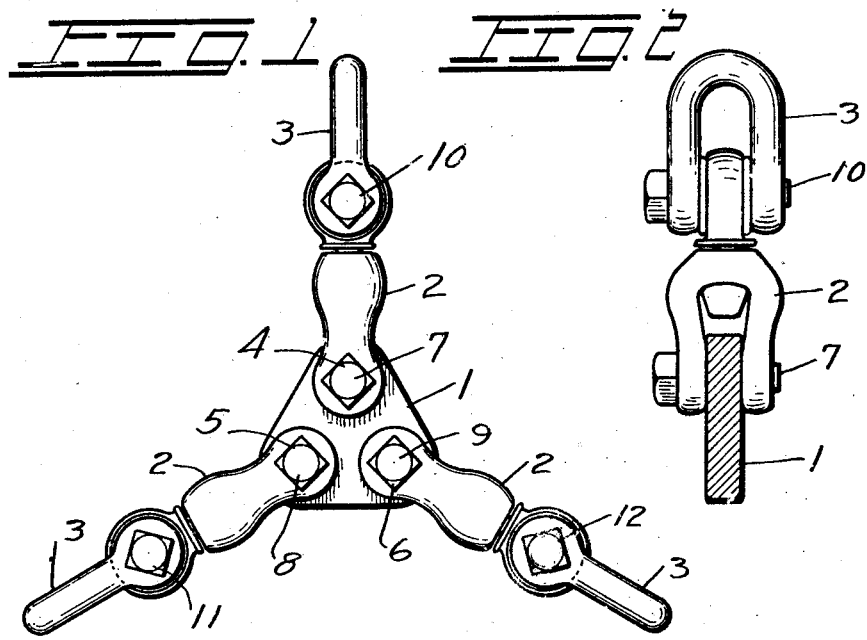
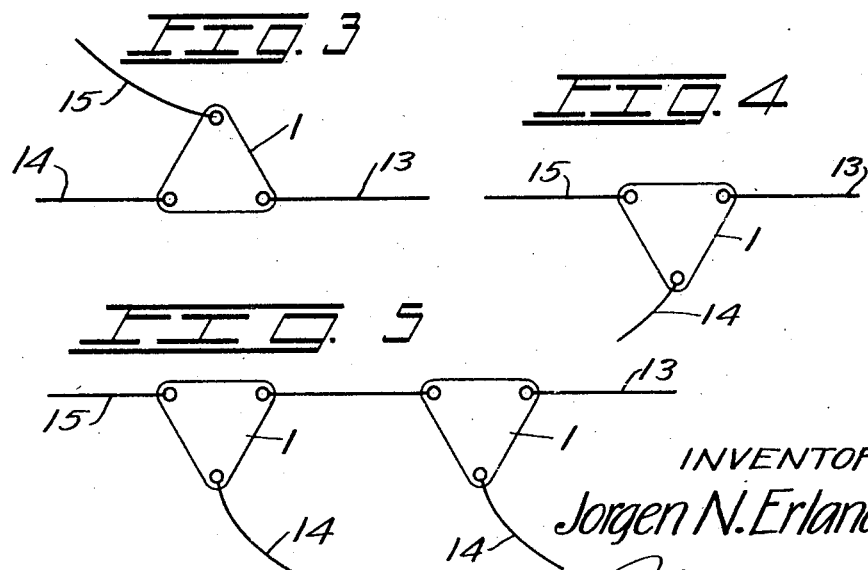
INVENTOR
Jorgen N. Erlandsen
Harry Bowen
ATTORNEY Patented Dec. 29, 1925.

1,567,719

UNITED STATES PATENT OFFICE.

JORGEN N. ERLANDSEN, OF EVERETT, WASHINGTON.

BUTT-LINE-RIGGING PLATE.

Application filed May 5, 1924. Serial No. 711,084.

*To all whom it may concern:*

Be it known that I, JORGEN N. ERLANDSEN, a citizen of the United States, residing at Everett, in the county of Snohomish and State of Washington, have invented a new and useful Butt-Line-Rigging Plate; and I do hereby declare that the following is a full, clear, and exact specification, such as will enable others skilled in the art to which it appertains to make and use the same.

The invention is a device for use in logging which makes a combination joint between the butt-line, the main line from the engine, and the haul-back with the distances between the centers of the pivots of the different lines equidistant.

The object of the invention is to provide a simple means for connecting the butt hook line, the main line, and the haulback line.

Another object of the invention is to provide a triple connection comprising a triangular shaped plate with three shackles having swivel connections pivotally attached to it.

And a further object of the invention is to provide a rigging plate for use in logging which has three swivel shackles symmetrically and pivotally attached to it.

With these ends in view the invention embodies a triangular shaped plate having three swivel shackles pivotally attached to it and other shackles pivotally attached to the outer ends of the swivel shackles.

Other features and advantages of the invention, will be seen from the following description taken in connection with the drawings, wherein:—

Figure 1 is a side view.

Figure 2 is a sectional view showing one of the shackles attached to the plate.

Figure 3 is a diagrammatic view showing the position of the plate when hauling under a load.

Figure 4 is a similar view showing the position of the plate when it is being drawn outward.

Figure 5 is a view showing an alternate arrangement in which two of the plates are used together.

In the drawings I have shown my device as it would be constructed wherein numeral 1 indicates the triangular shaped plate, numeral 2 the swivel shackles, and numeral 3 the outer shackles. The swivel shackles 2 are pivotally attached to the plate 1 by bolts 4, 5, and 6, the centers of which are at points 7, 8, and 9 which are the points of an equilateral triangle in the plate 1, and the shackles 3 are pivotally attached to the shackles 2 by the bolts 10, 11, and 12.

It will be understood that changes may be made in the construction without departing from the spirit of the invention. One of which changes may be in the use of any other type of swivel shackles instead of the shackles 2, another may be in the use of any other means for attaching the cables to the swivel joints instead of the shackles 3, and still another may be in the use of any other means for pivotally attaching the shackles together in place of the plate 1.

The construction will be readily understood from the foregoing description. To use the device it may be inserted in the rigging and when it is used to draw in the log it will assume the position shown in Figure 3 with the main line 13 and the butt-hook line 14 taut and the out-haul or haul-back line 15 slack as shown in Figure 3. This will permit the three lines to be pivotally connected through a single connection which is free to assume different positions for different requirements so that there will be no twists or eccentric loads in the rigging. In Figure 4 the device is shown in the position it would assume as the butt-hook line is being drawn outward away from the engine, as in this position the haul-back line 15 and the main line 13, which is feeding from the drum, are taut and the butt-hook line 14 which is not carrying a load is slack. It will be seen that in this position the plate is rotated in a counter-clockwise direction a sufficient distance to permit the lines 13 and 15 to assume a straight line, and it will also be observed that as a load is applied to the line 14 and a pull applied to the line 13 the plate will again rotate in a clockwise direction so that these two lines will be in a straight line.

An alternate arrangement is shown in Figure 5 in which two of the devices are shown in one line as it is often required to draw in more than one load or set of loads at one time and it is also understood that as many of these devices as may be desired may be used in a line or in combination and arranged in any suitable manner.

Having thus fully described the invention, what I claim as new and desire to secure by Letters Patent, is:—

1. A butt-line rigging plate having three shackles pivotally attached to it, said shackles having swivel joints and said pivot points of the shackles forming an equilateral triangle in the plate.

2. A butt-line rigging plate of the class described comprising a plate having a plurality of swivel shackles attached to it at points that are equidistant from each other.

3. A butt-line rigging plate of the class described having a plurality of shackles with swivel joints in them, and a means for connecting the shackles together and holding them so that their pivot points will form an equilateral triangle.

4. In a butt-line rigging plate, a plurality of swivel shackles, other shackles pivotally attached to the outer ends of the shackles, and a means for pivotally holding the shackles to a common member in such a manner that the centers of their pivots will be in the vertexes of an equilateral polygon.

5. A rigging joint of the class described having a plurality of swivel shackles pivotally attached to the vertexes of an equilateral polygon and having suitable means in their outer ends to which a cable or the like may be attached.

6. A device of the class described comprising a triangular shaped plate with swivel shackles pivotally attached to it, the centers of the pivots of said shackles being equidistant from each other and located adjacent the vertexes of the triangular shaped plate.

7. A device of the class described comprising a triangular shaped plate having three shackles with swivel joints in their outer ends pivotally attached to it at points, which are equidistant from each other and in the vertexes of the plate, said swivel joints having shackles attached to them.

JORGEN N. ERLANDSEN.